(12) United States Patent
Chang et al.

(10) Patent No.: US 11,937,574 B2
(45) Date of Patent: Mar. 26, 2024

(54) INTERACTIVE DEVICE FOR ANIMALS

(71) Applicant: Tomofun Co., Ltd., Taipei (TW)

(72) Inventors: Chia-Yen Chang, Taipei (TW);
Min-Wei Chen, Taipei (TW); Yo-Chen Victor Chang, Taipei (TW)

(73) Assignee: TOMOFUN CO., LTD., Taipei (TW)

( * ) Notice: Subject to any disclaimer, the term of this patent is extended or adjusted under 35 U.S.C. 154(b) by 129 days.

(21) Appl. No.: 17/467,893

(22) Filed: Sep. 7, 2021

(65) Prior Publication Data
US 2023/0073799 A1   Mar. 9, 2023

(51) Int. Cl.
| | |
|---|---|
| *A01K 15/02* | (2006.01) |
| *A01K 5/02* | (2006.01) |
| *B25J 9/00* | (2006.01) |
| *B25J 13/08* | (2006.01) |
| *B25J 19/02* | (2006.01) |
| *B65G 47/12* | (2006.01) |

(52) U.S. Cl.
CPC .............. *A01K 15/025* (2013.01); *A01K 5/02* (2013.01); *B25J 9/0003* (2013.01); *B25J 13/08* (2013.01); *B25J 19/023* (2013.01); *B65G 47/12* (2013.01); *B65G 2203/0233* (2013.01)

(58) Field of Classification Search
CPC ...... A01K 5/0114; A01K 5/0291; A01K 5/02; A01K 15/02; A01K 5/0275; A01K 5/0121; A01K 61/85; A01K 5/0233; A01K 5/0241; A01K 5/0225; A63B 69/406; A63B 2069/0008; A63B 2069/402; A63B 69/40; A63B 69/0002; A63B 2243/0025; A63B 47/002

USPC ...... 119/51.01, 61.5, 52.1, 61.54; 124/6, 81, 124/51.1, 49, 436
See application file for complete search history.

(56) References Cited

U.S. PATENT DOCUMENTS

| | | | |
|---|---|---|---|
| 3,920,224 A * | 11/1975 | Fassauer | A01K 5/0291 366/195 |
| 5,107,820 A | 4/1992 | Salansky | |
| 2010/0132616 A1* | 6/2010 | Rieger | A01K 5/0225 119/57.91 |
| 2012/0048201 A1 | 3/2012 | Qian | |

(Continued)

FOREIGN PATENT DOCUMENTS

| | | |
|---|---|---|
| CN | 203814355 U | 9/2014 |
| CN | 105432492 A | 3/2016 |

(Continued)

*Primary Examiner* — Peter M Poon
*Assistant Examiner* — Jeffrey R Larsen
(74) *Attorney, Agent, or Firm* — McClure, Qualey & Rodack, LLP

(57) ABSTRACT

An interactive device for animals is provided that includes a main body, a driving module and a first rotating member. The main body includes an accommodating groove, an opening, and a communicating channel. The driving module is disposed on the main body. The first rotating member is rotatably disposed in the main body and separates the communicating channel and the accommodating groove. When the driving module drives the first rotating member to rotate in a first rotating direction, the first rotating member drives at least one object disposed in the accommodating groove to enter the communicating channel and leave the main body through the opening.

17 Claims, 14 Drawing Sheets

(56) References Cited

U.S. PATENT DOCUMENTS

| | | | |
|---|---|---|---|
| 2016/0000036 A1* | 1/2016 | Cornwell, Jr. | A01K 5/0291 |
| | | | 119/51.11 |
| 2016/0227737 A1* | 8/2016 | Dzamba | A01K 5/0225 |
| 2016/0227741 A1 | 8/2016 | Hsu et al. | |
| 2018/0303062 A1 | 10/2018 | Simard et al. | |
| 2019/0133075 A1 | 5/2019 | Holovin et al. | |
| 2019/0224555 A1 | 7/2019 | Ward | |
| 2020/0137981 A1 | 5/2020 | Hamill et al. | |
| 2021/0298268 A1* | 9/2021 | Lin | A01K 5/0225 |
| 2021/0307289 A1* | 10/2021 | Baxter | A01K 5/0291 |
| 2021/0315185 A1* | 10/2021 | Qiu | A01K 15/025 |
| 2022/0079115 A1 | 3/2022 | Tsai et al. | |
| 2022/0132799 A1* | 5/2022 | Wang | A01K 29/005 |
| | | | 119/57.91 |

FOREIGN PATENT DOCUMENTS

| | | |
|---|---|---|
| CN | 112005906 A | 12/2020 |
| CN | 112450098 A | 3/2021 |
| TW | M502334 U | 6/2015 |
| TW | M515274 U | 1/2016 |
| TW | 202137875 A | 10/2021 |

* cited by examiner

INTERACTIVE DEVICE FOR ANIMALS

BACKGROUND OF THE DISCLOSURE

Field of the Disclosure

The present disclosure relates to an interactive device for animals, and in particular, to an interactive device for animals used for throwing an object.

Description of the Related Art

Lots of people keep pets at home, but it is difficult to monitor the pet's behavior and the pet's physical condition when the pet owner leaves the pet home alone. Thus, some pet owners dispose a photography apparatus at home to observe the pet's behavior.

However, there can be no interaction with the pet when using a conventional photography apparatus, making it hard to attract the pet to approach the photography apparatus. Furthermore, the pet's physical condition may deteriorate from lack of exercise. Therefore, how to interact with the pet when the pet owner cannot stay with the pet has become an important issue.

BRIEF SUMMARY OF THE DISCLOSURE

Accordingly, one objective of the present disclosure is to provide an interactive device for animals that solves the above problems.

According to some embodiments of the disclosure, an interactive device for animals is provided and includes a main body, a driving module and a first rotating member. The main body includes an accommodating groove, an opening and a communicating channel. The driving module is disposed on the main body. The first rotating member is rotatably disposed in the main body and separates the communicating channel and the accommodating groove. When the driving module drives the first rotating member to rotate in a first rotating direction, the first rotating member drives at least one object disposed in the accommodating groove to enter the communicating channel and leave the main body through the opening.

According to some embodiments, the first rotating member has a rotating axis and a plurality of blades, and when viewed along the rotating axis, each of the blades deviates from the axis.

According to some embodiments, a loading slot is formed between adjacent two of the blades, and the loading slot is configured to load the object.

According to some embodiments, a protruding portion is formed on the end of each of the blades, and the protruding portion protrudes along the first rotating direction.

According to some embodiments, the main body includes an upper member and a contacting member, the accommodating groove is formed by the upper member and the contacting member, and an enclosed space is formed by the contacting member and adjacent two of the blades.

According to some embodiments, the interactive device further includes a pushing mechanism, movably disposed on the upper member, and the driving module includes a first motor, a first gear and a first rotating shaft. The first motor is disposed on the main body. The first rotating shaft is configured to be connected to the first motor, the first rotating member and the first gear. When the first motor drives the first rotating shaft to rotate, the first gear drives the pushing mechanism to push the object into the loading slot.

According to some embodiments, the driving module further includes a second gear which is connected to the first rotating shaft, and the pushing mechanism includes: a pushing member and a linking member. The pushing member is configured to push the objects. The linking member is connected between the pushing member and the first gear and connected between the pushing member and the second gear. When the first motor drives the first rotating shaft to rotate, the first gear and the second gear cooperatively drive the linking member to move the pushing member forward the accommodating groove.

According to some embodiments, the number of teeth on the first gear and the number of blades are the same, and the pushing mechanism further includes an elastic element disposed between the linking member and the upper member.

According to some embodiments, the interactive device further includes a second rotating member, disposed in the communicating channel, and the driving module is configured to drive the second rotating member to rotate in the first rotating direction to push the object to leave the main body.

According to some embodiments, the interactive device further includes a sensor disposed between the first rotating member and the second rotating member, and the sensor is configured to sense whether the object enters the communicating channel.

According to some embodiments, the main body includes a lower member, the lower member forms the communicating channel and has a first guiding surface and a second guiding surface, the second rotating member is disposed between first guiding surface and the second guiding surface, and the first guiding surface and the second guiding surface are configured to guide the object to move in the communicating channel.

According to some embodiments, an angle between the first guiding surface and the second guiding surface is 15 to 75 degrees.

According to some embodiments, the communicating channel further has an arc surface connected between the first guiding surface and the second guiding surface, and when there are residues of the object disposed on the arc surface, the driving module is configured to drive the second rotating member to rotate individually so as to blow the residues out of the communicating channel through the opening.

According to some embodiments, the driving module is configured to drive the first rotating member or the second rotating member to rotate independently.

According to some embodiments, after the second rotating member pushes the object to leave the main body, the driving module is configured to drive the second rotating member back to an initial position.

According to some embodiments, a plurality of objects is disposed in the accommodating groove, and a number of the objects leaving the main body corresponds to a rotating speed of the first rotating member.

According to some embodiments, the interactive device further includes: a circuit module and a video/audio transceiver. The circuit module is disposed on the main body, wherein the circuit module includes a control circuit. The video/audio transceiver is disposed on the main body and electrically connected to the circuit module, wherein the video/audio transceiver includes a camera. The camera and the opening face the same side of the main body.

According to some embodiments, the control circuit is configured to determine whether the object leaves the opening according to an image captured by the camera or a detecting signal from a sensor disposed in the communicating channel, wherein when the control circuit determines that the object does not leave the opening, the control circuit controls the driving module to drive the first rotating member and/or the second rotating member to rotate in a second rotating direction, and the first rotating direction is opposite of the second rotating direction.

According to some embodiments, the interactive device further includes a base, the main body is rotatably connected to the base, and the driving module is configured to drive the main body to rotate around a rotating axis of the base.

According to some embodiments, the rotating axis is perpendicular to a rotating axis of the first rotating member.

The present disclosure provides an interactive device for the user to interact with his/her pet locally or remotely. The interactive device includes the main body, and the main body has the upper member and the lower member. The upper member is configured to accommodate a lot of objects, and the lower member forms the communicating channel and the opening for the objects passing through. The first rotating member and the second rotating member are disposed in the main body for driving the objects to be thrown out of the main body smoothly.

In addition, the user can use a smartphone to control the interactive device. For example, the user can control the direction and the number of the objects to be thrown, so as to catch pet's attention effectively. For example, the main body can rotate relative to the base to change the direction. Moreover, the interactive device further includes the video/audio transceiver for allowing the user to interact with the pets remotely.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
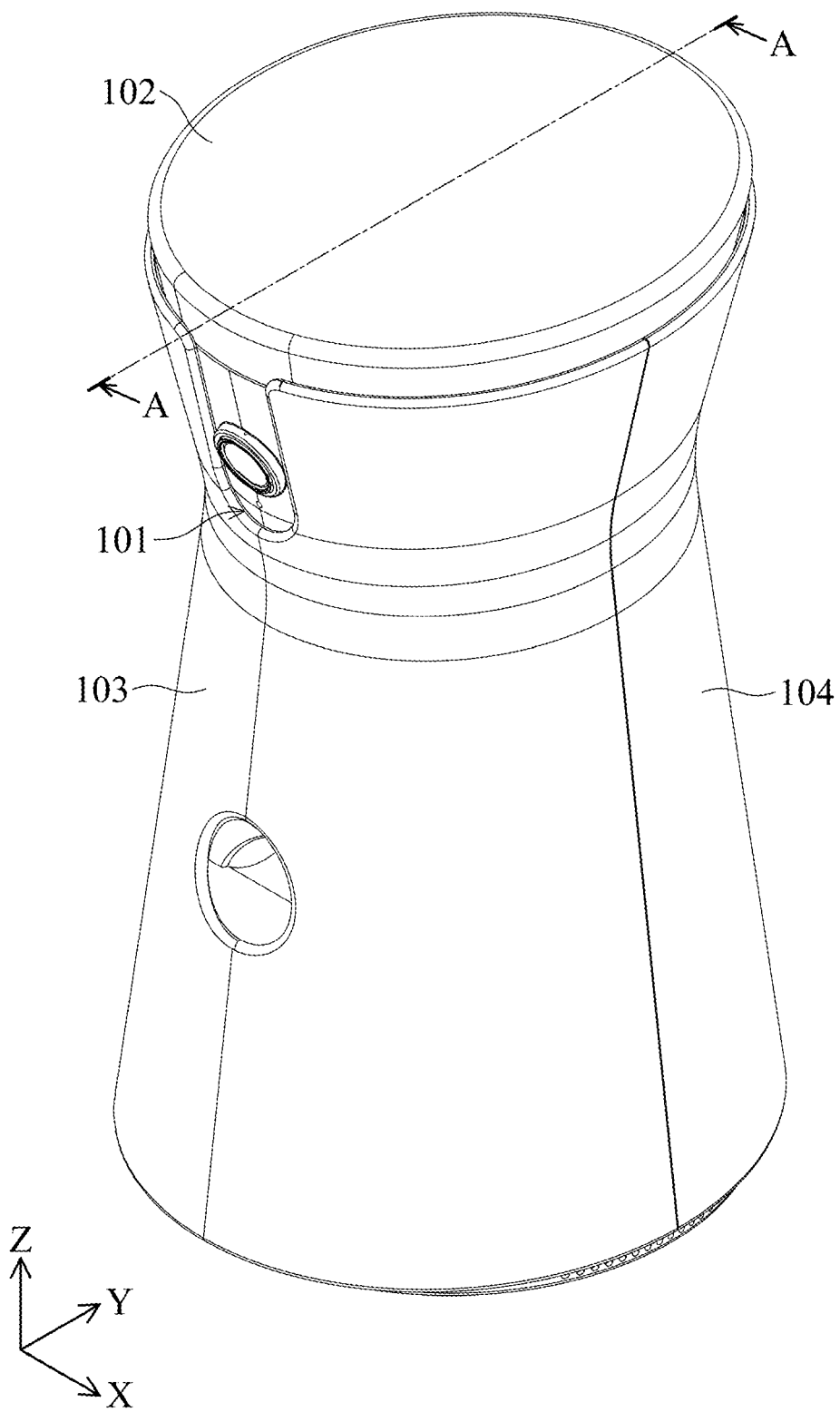
FIG. 1 is a schematic diagram of an interactive device 100 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
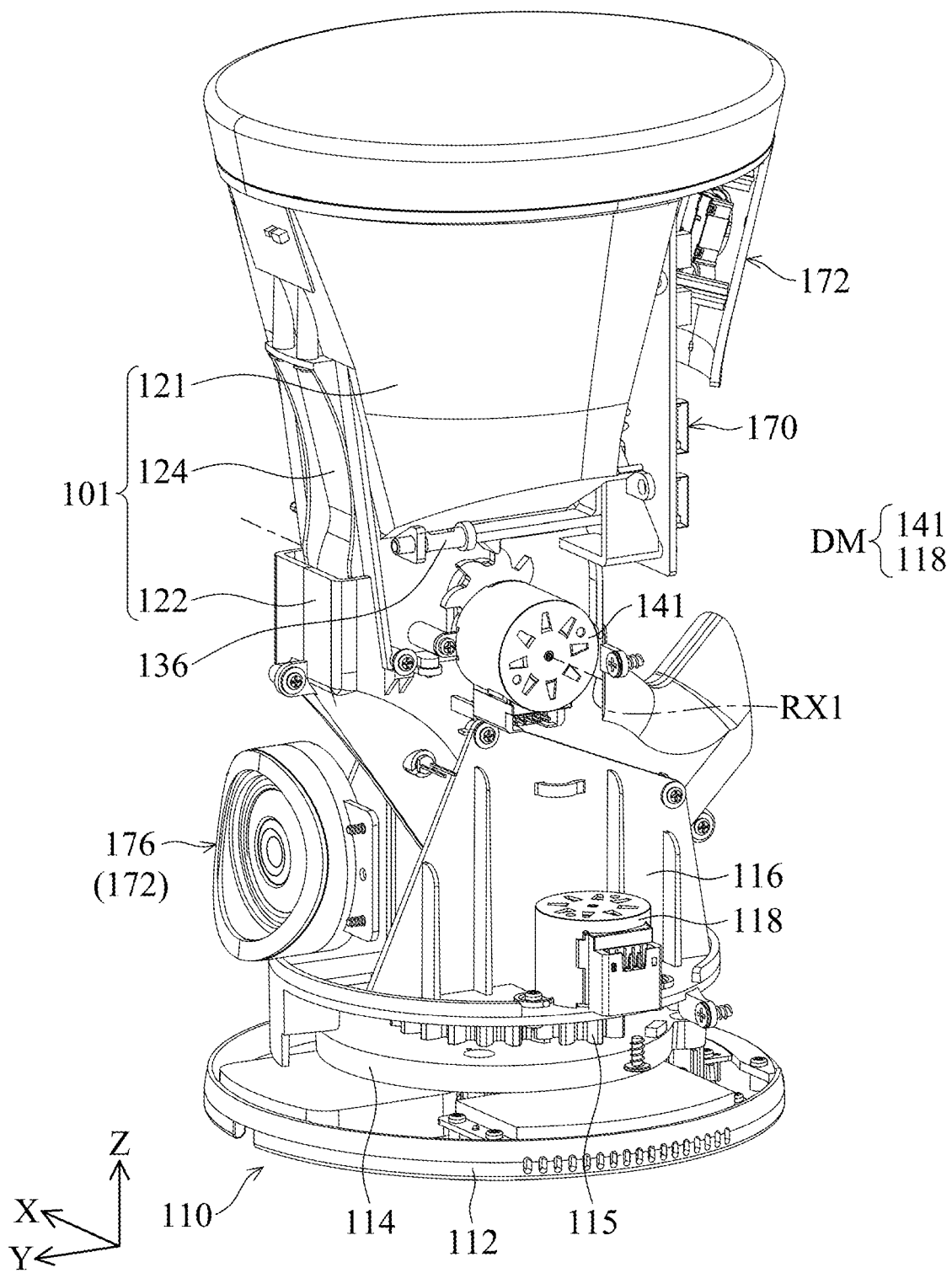
FIG. 2 is a diagram of a partial structure of the interactive device 100 according to an embodiment of the present disclosure.
Figure 3:
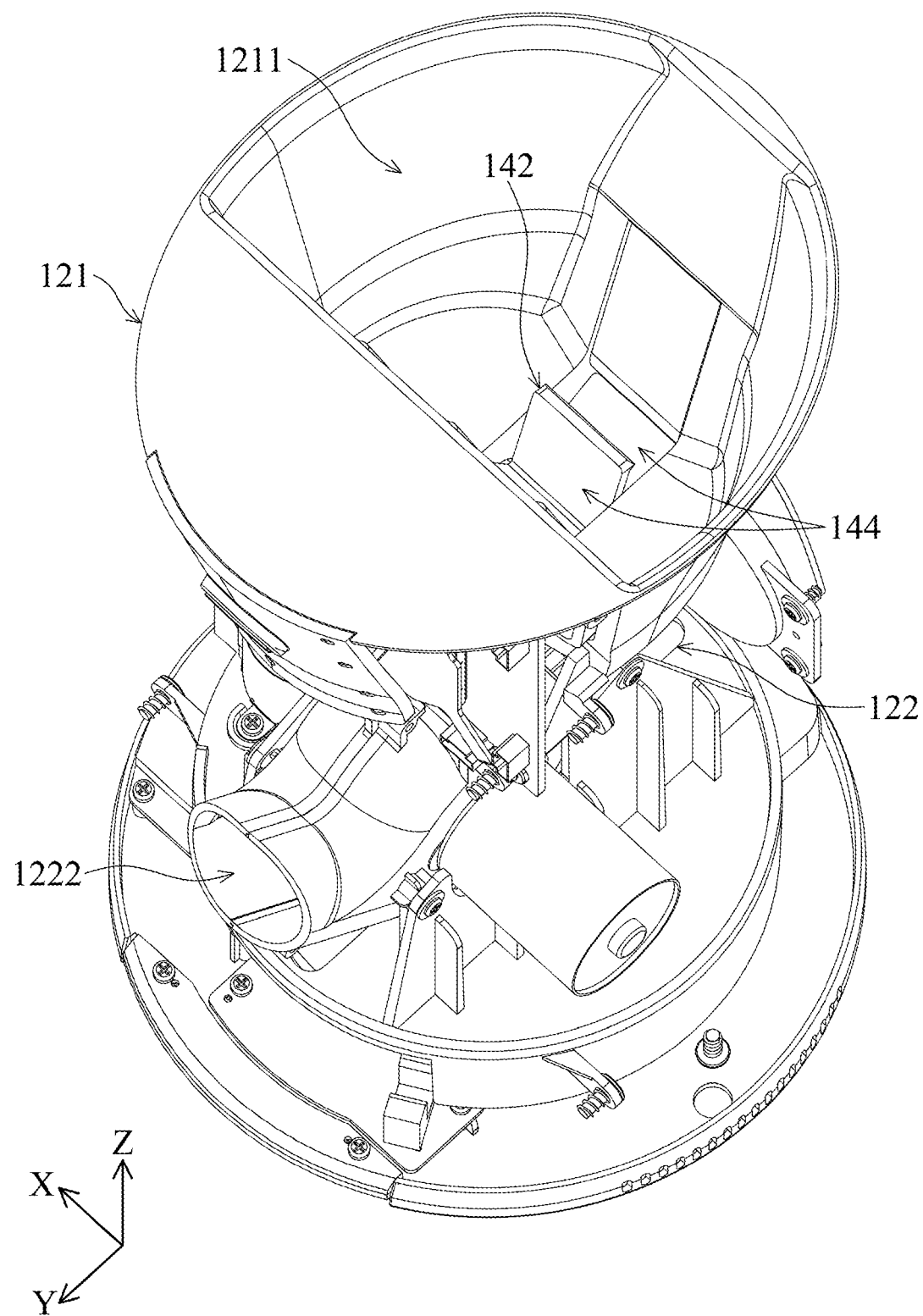
FIG. 3 is a diagram of a partial structure of the interactive device 100 in another view according to an embodiment of the present disclosure.
Figure 4:
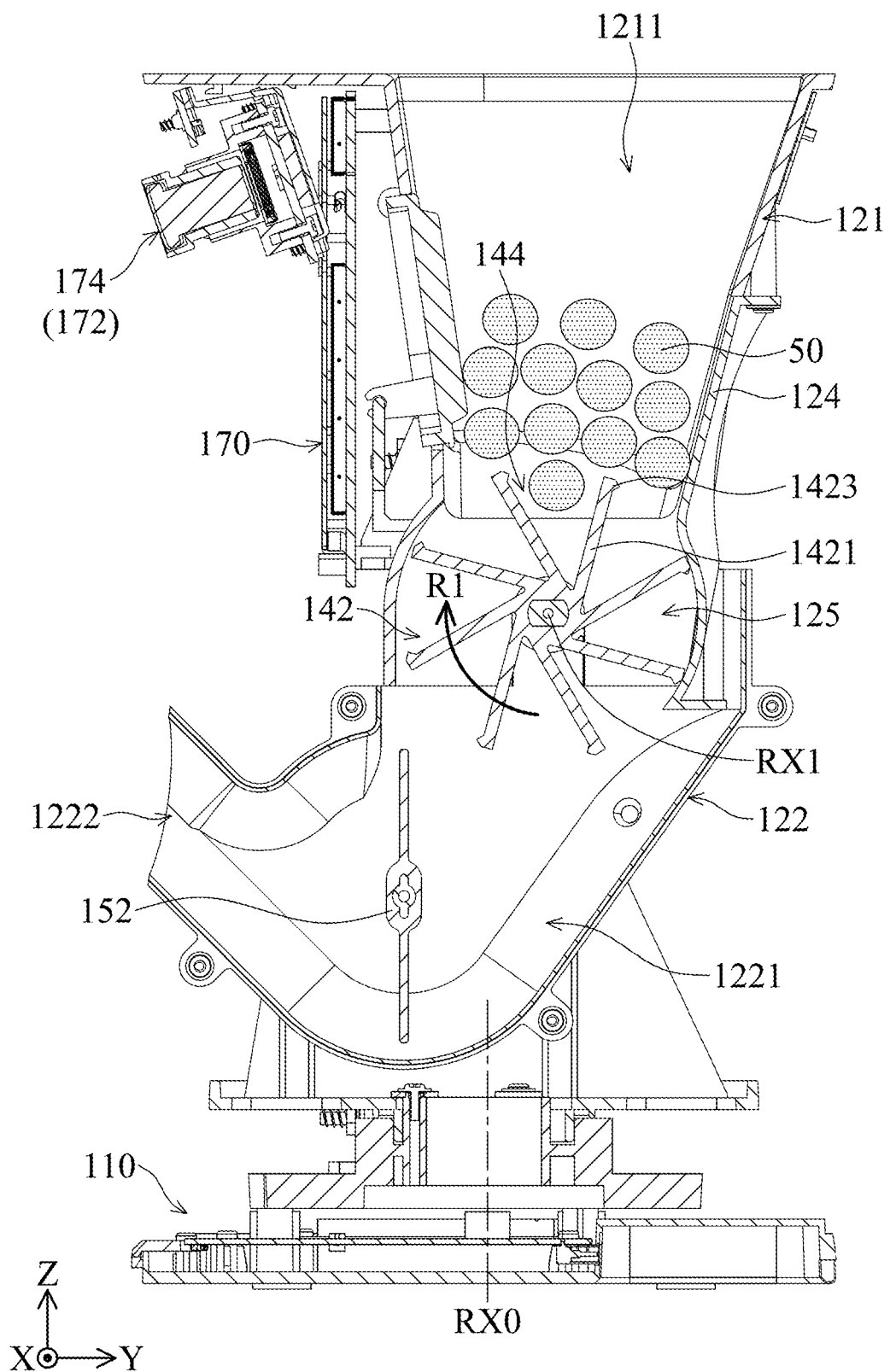
FIG. 4 is a cross-sectional view of the interactive device 100 along line A-A in FIG. 1 according to an embodiment of the present disclosure.

Please refer to FIG. 1 to FIG. 4. FIG. 1 is a schematic diagram of an interactive device 100 according to an embodiment of the present disclosure, FIG. 2 is a diagram of a partial structure of the interactive device 100 according to an embodiment of the present disclosure, FIG. 3 is a diagram of a partial structure of the interactive device 100 in another view according to an embodiment of the present disclosure, and FIG. 4 is a cross-sectional view of the interactive device 100 along line A-A in FIG. 1 according to an embodiment of the present disclosure.

In this embodiment, the interactive device 100 is configured to interact with animals, such as a user's pet. The interactive device 100 is configured to throw an object 50 (such as pet's food) to attract pet's attention, and the interactive device 100 includes a main body 101, a cover 102, a front case 103 and a rear case 104. The cover 102 is detachably disposed on the main body 101, and the front case 103 and the rear case 104 are respectively disposed on the front side and the rear side of the main body 101 for protecting the main body 101.

As shown in FIG. 1 to FIG. 3, the main body 101 includes an upper member 121 and a lower member 122 which are fixedly connected to each other. The upper member 121 has an accommodating groove 1211, and the cover 102 can cover the upper member 121 for enclosing the accommodating groove 1211. The cover 102 can be detached from the upper member 121, and then accommodating groove 1211 is configured to accommodate a lot of object 50.

As shown in FIG. 4, the lower member 122 has a communicating channel 1221 and an opening 1222, the object 50 may moves from the accommodating groove 1211 into the communicating channel 1221, and then the object 50 may be pushed out through the opening 1222.

In addition, as shown in FIG. 2, the interactive device 100 further includes a base assembly 110, and the base assembly 110 includes a base 112, a base gear 114, a driving gear 115, a holding member 116 and a base motor 118. The holding member 116 is configured to hold the main body 101, the base gear 114 is disposed between the holding member 116 and the base 112.

The base motor 118 is fixedly disposed on the holding member 116 and is configured to drive the driving gear 115 to rotate. The driving gear 115 is coupled to the base gear 114. When the base motor 118 drives the driving gear 115 to rotate, the base gear 114 is driven correspondingly, so that the holding member 116 and the main body 101 can be rotated around a rotating axis RX0 of base 112 relative to the base 112.

As shown in FIG. 2 and FIG. 4, the interactive device 100 includes a driving module DM, and the driving module DM includes a first motor 141 and a first rotating member 142. The first motor 141 is fixedly disposed on the main body 101, and the first rotating member 142 is rotatably disposed in the main body 101 and is configured to separate the communicating channel 1221 and the accommodating groove 1211.

The first motor 141 is configured to drive the first rotating member 142. When the first motor 141 drives the first rotating member 142 to rotate in a first rotating direction R1, the first rotating member 142 may drive one of the object 50 disposed in the accommodating groove 1211 to enter the communicating channel 1221 and then leave the main body 101 through the opening 1222.

In this embodiment, as shown in FIG. 4, the first rotating member 142 has a rotating axis RX1 and a plurality of blades 1421, and when viewed along the rotating axis RX1, each of the blades 1421 deviates from the rotating axis RX1. That is, the extending direction of the blade 1421 does not pass through the rotating axis RX1.

In addition, it should be noted that the rotating axis RX0 is perpendicular to a rotating axis RX1 of the first rotating member 142.

As shown in FIG. 3 and FIG. 4, a loading slot 144 is formed between adjacent two of the blades 1421, and the loading slot 144 is configured to load the object 50. In addition, the main body 101 further includes a contacting member 124, the accommodating groove 1211 is formed by the upper member 121 and the contacting member 124, and an enclosed space 125 is formed by the contacting member 124 and adjacent two of the blades 1421, as shown in FIG. 4.

It should be noted that a protruding portion 1423 is formed on an end of each of the blades 1421, and the protruding portion 1423 protrudes along the first rotating direction R1. In this embodiment, the contacting member 124 is made of a resilient material, such as resilient plastic. Therefore, based on the design of the protruding portion 1423 and the contacting member 124, the objects 50 can be loaded in the loading slot 144 one by one smoothly and without being jammed.

In this embodiment, the protruding portion 1423 is a triangular prism, and the height of the protruding portion 1423 may be 1 millimeter, but it is not limited thereto. Any shape of the protruding portion 1423 capable of avoiding the objects 50 from being jammed is within the scope of the present disclosure.

Figure 5:
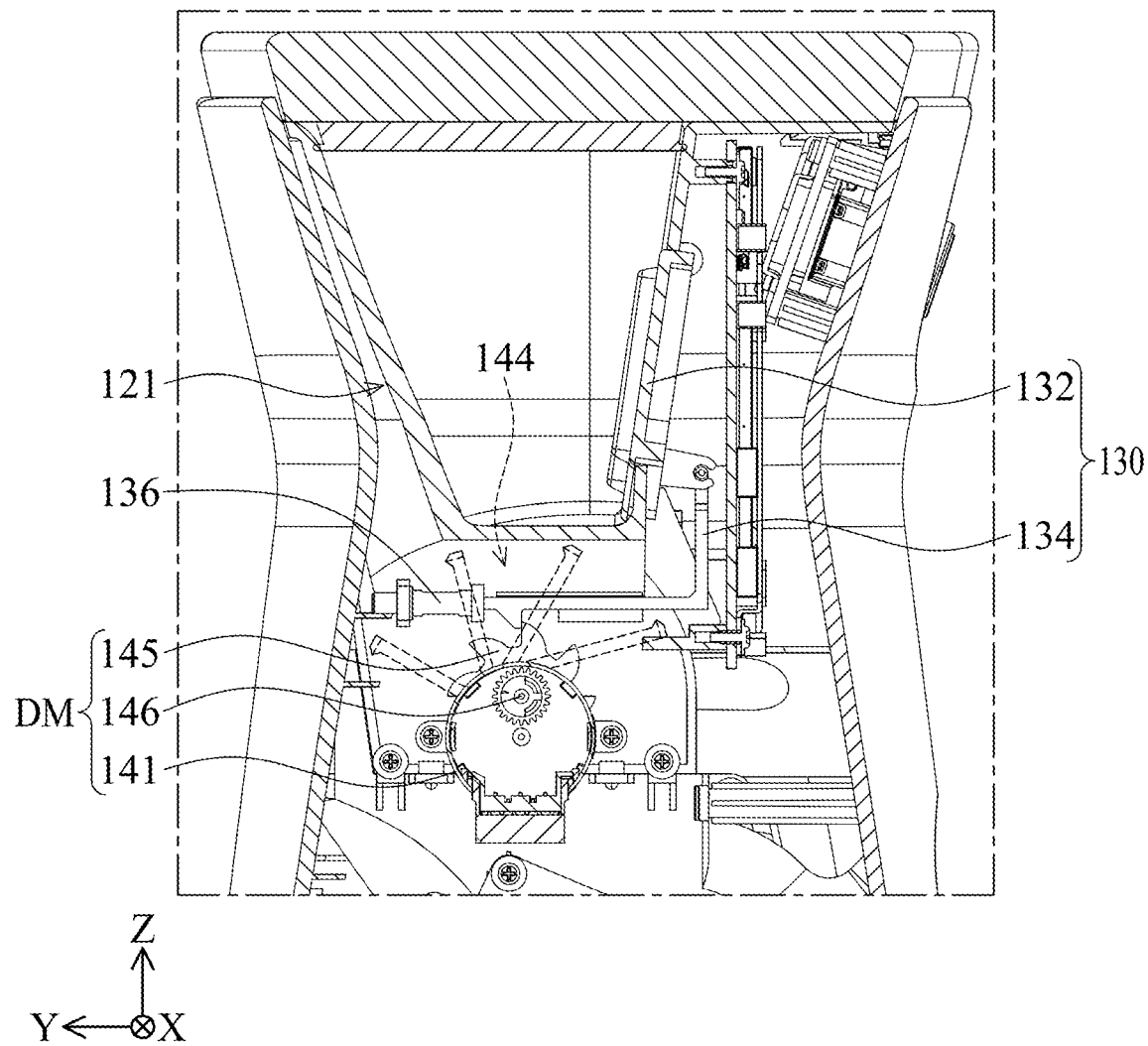
FIG. 5 and FIG. 6 are cross-sectional views illustrating the movement of a pushing mechanism 130 according to an embodiment of the present disclosure.
Figure 6:
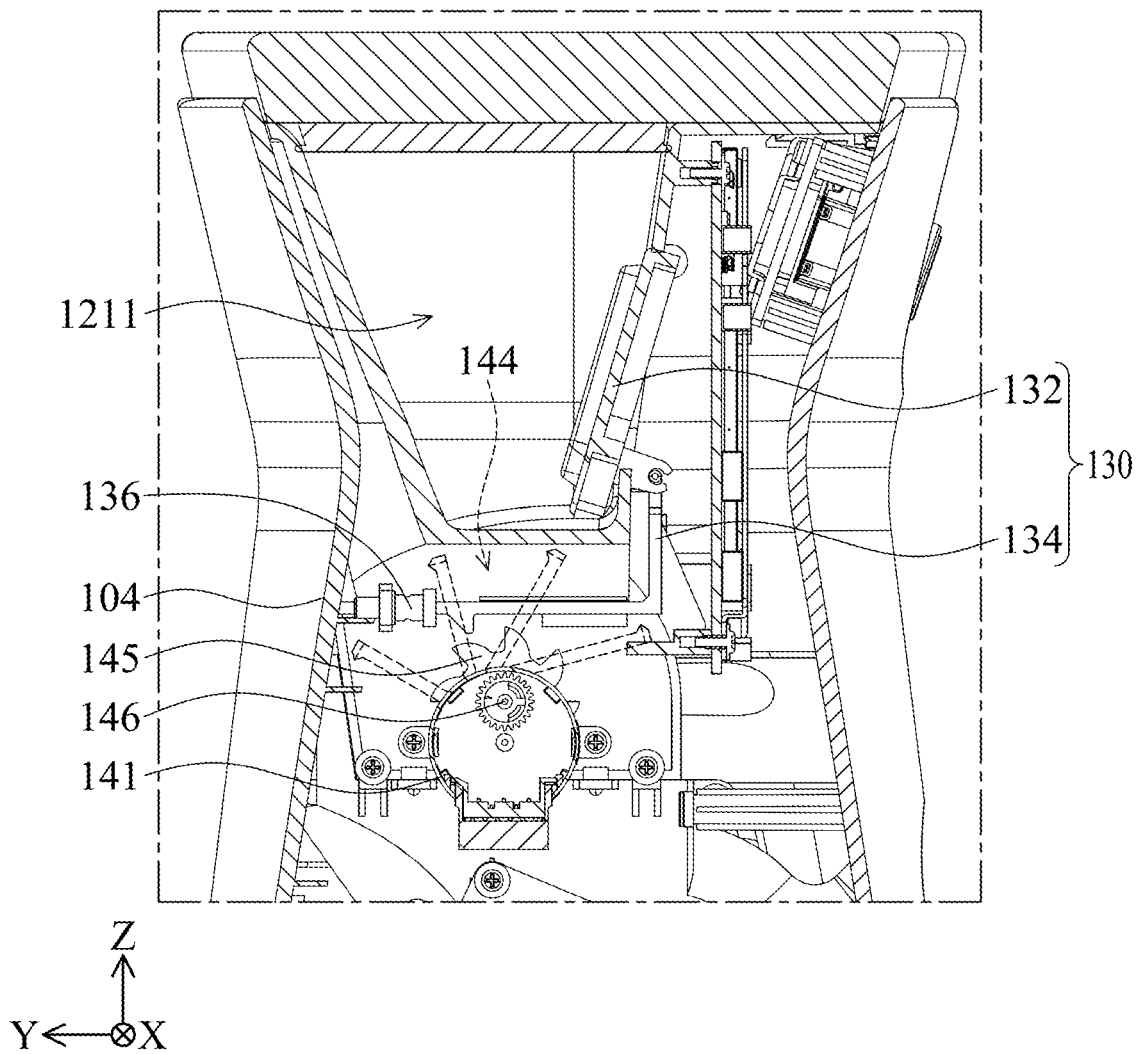
Figure 7:
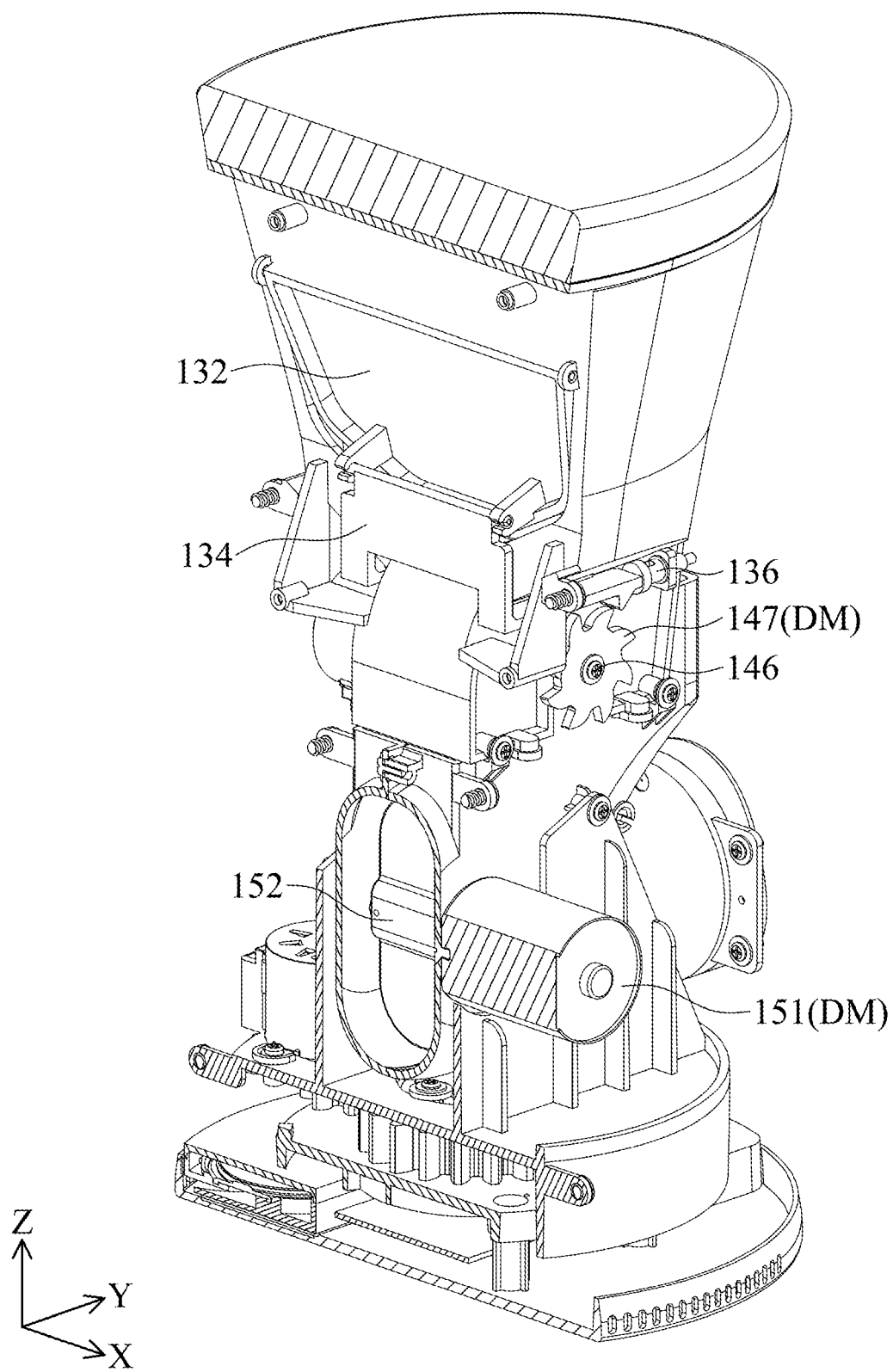
FIG. 7 is a cross-sectional view of a partial structure of the interactive device 100 in another view according to an embodiment of the present disclosure.

Next, please refer to FIG. 5 to FIG. 7. FIG. 5 and FIG. 6 are cross-sectional views illustrating the movement of a pushing mechanism 130 according to an embodiment of the present disclosure, and the FIG. 7 is a cross-sectional view of a partial structure of the interactive device 100 in another view according to an embodiment of the present disclosure. In some embodiments, the interactive device 100 may further include a pushing mechanism 130 movably disposed on the upper member 121, for pushing the objects 50 toward the loading slot 144.

In addition, the driving module DM includes a first gear 145 and a first rotating shaft 146, and the first rotating shaft 146 is configured to be connected to the first motor 141, the first rotating member 142 and the first gear 145. When the first motor 141 drives the first rotating shaft 146 to rotate, the first gear 145 rotates correspondingly to drive the pushing mechanism 130 to push the objects 50, so as to help the object 50 to be loaded into the loading slot 144.

In particular, the driving module DM further includes a second gear 147 which is connected to the first rotating shaft 146, and the pushing mechanism 130 includes a pushing member 132 and a linking member 134. The pushing member 132 is configured to push the objects 50, and the linking member 134 is connected between the pushing member 132 and the first gear 145 and connected between the pushing member 132 and the second gear 147.

When the first motor 141 drives the first rotating shaft 146 to rotate, the first gear 145 and the second gear 147 cooperatively drive the pushing member 132 to move forward the accommodating groove 1211 by the linking member 134. In particular, the first gear 145 and the second gear 147 drive the linking member 134 to move from the position in FIG. 5 to the position in FIG. 6, and the pushing member 132 is moved from the position in FIG. 5 to the position in FIG. 6 correspondingly.

In this embodiment, as shown in FIG. 2 and FIG. 7, the pushing mechanism 130 may further include two elastic elements 136 disposed between the linking member 134 and the upper member 121. The elastic elements 136 are configured to provide an elastic force to push the linking member 134 to move from the position in FIG. 6 back to the position in FIG. 5, and the pushing member 132 is moved from the position in FIG. 6 to the position in FIG. 5 correspondingly. The elastic element 136 may be a spring, but it is not limited thereto.

It should be noted that the number of teeth on the first gear 145 and the number of blades 1421 are the same, and the number of teeth on the first gear 145 is the same as or a multiple of the number of teeth on the second gear 147.

Figure 8:
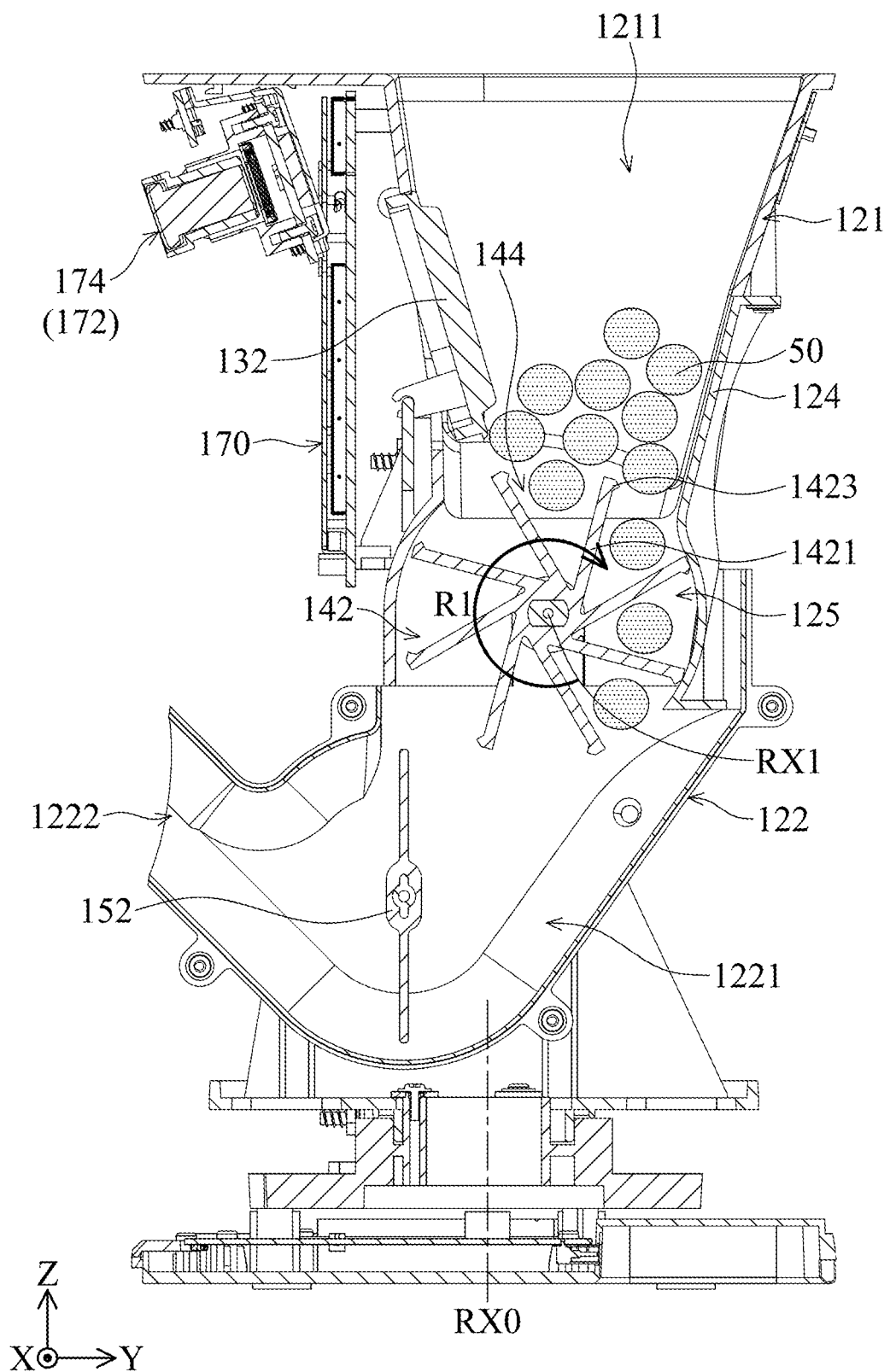
FIG. 8 to FIG. 10 are diagrams illustrating a procedure of the objects 50 moving in the communicating channel 1221 and being thrown out of the opening 1222 according to an embodiment of the present disclosure.
Figure 9:
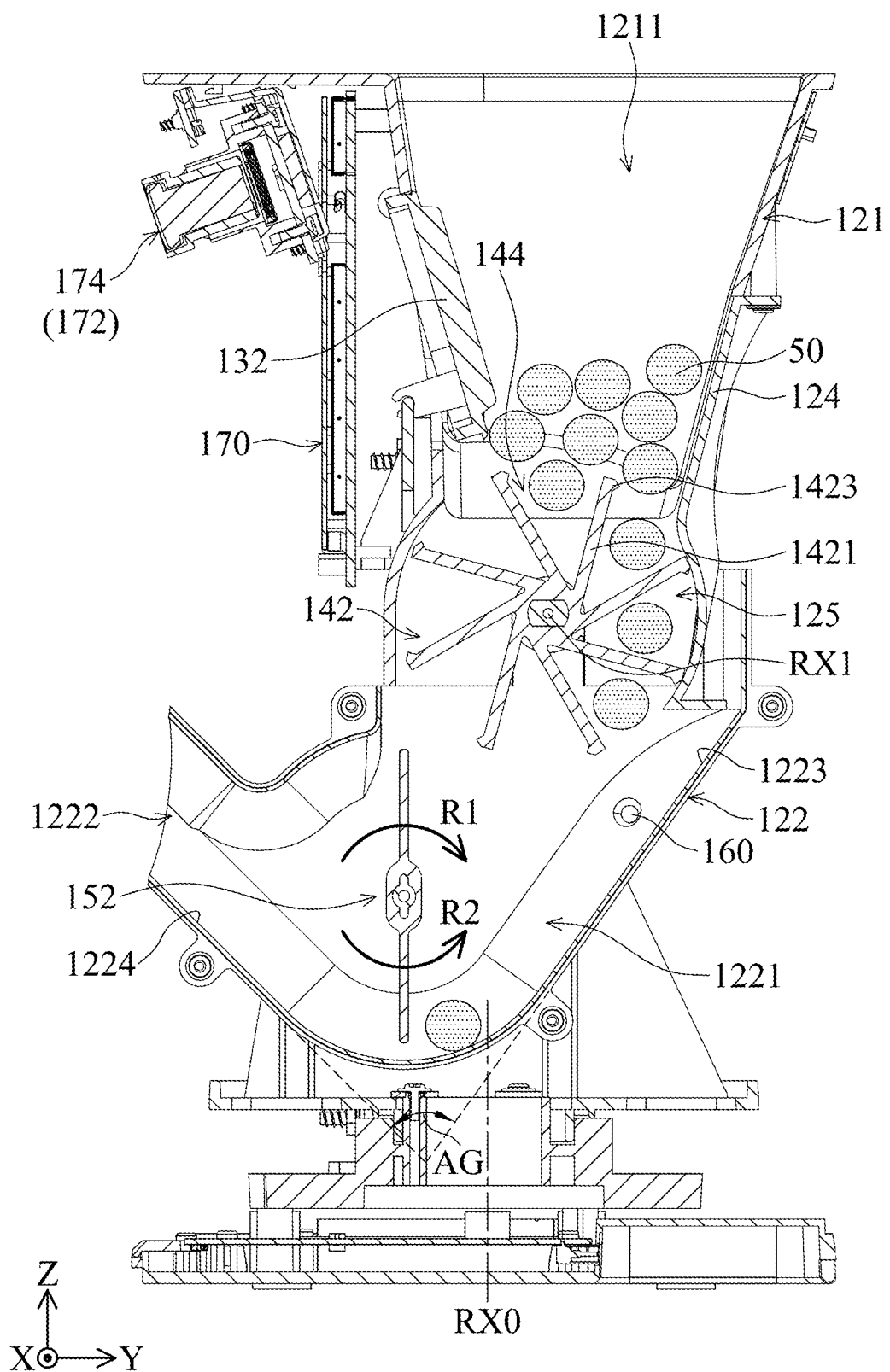
Figure 10:
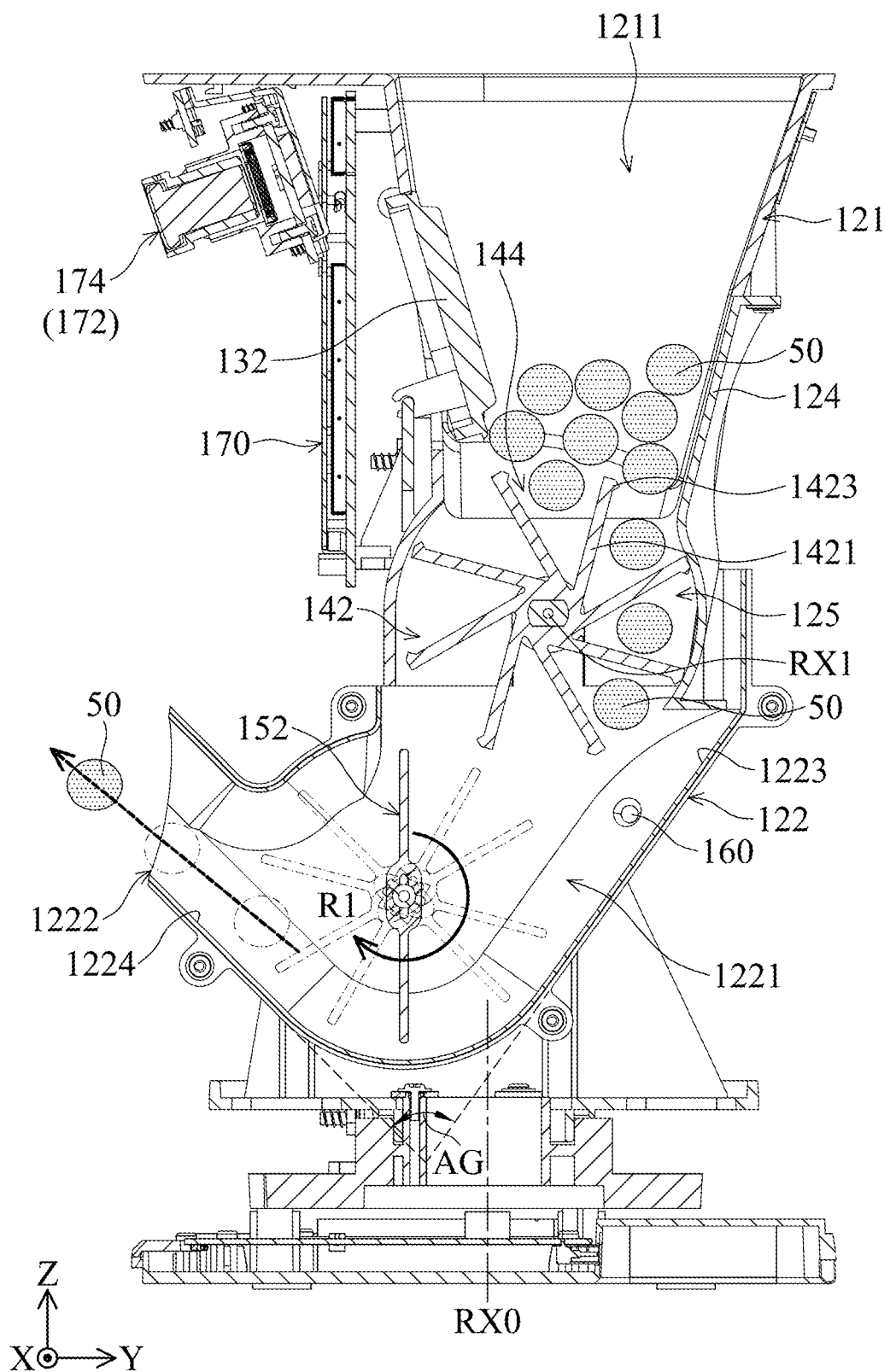

Please refer to FIG. 4 and FIG. 8 to FIG. 10. FIG. 8 to FIG. 10 are diagrams illustrating a procedure of the objects 50 moving in the communicating channel 1221 and being thrown out of the opening 1222 according to an embodiment of the present disclosure. As shown in and FIG. 4 and FIG. 8, when the first rotating member 142 keeps rotating, the objects 50 are loaded in the loading slots 144 one by one, and then the first one of the object 50 enters the communicating channel 1221, as shown in FIG. 9.

In this embodiment, the interactive device 100 further includes a second rotating member 152 which is disposed in the communicating channel 1221, and the driving module DM further includes a second motor 151 disposed on the main body 101 (FIG. 7) and configured to drive the second rotating member 152 to rotate in the first rotating direction R1. Therefore, as shown in FIG. 10, the second rotating member 152 pushes the first object 50 to leave the main body 101 through the opening 1222.

It should be noted that after the second rotating member 152 pushes the object 50 to leave the main body 101, the blades of the second rotating member 152 may not be perpendicular to the Y-axis. In order to ensure the distance of the object 50 being thrown out is the same every time, the driving module DM is configured to drive the second rotating member 152 back to an initial position (such as the position in FIG. 9) before driving another object 50.

In some embodiments, the second rotating member 152 is made of a resilient material, but it is not limited thereto. When the second rotating member 152 is made of a resilient material, the noise generated from the second rotating member 152 can be effectively reduced.

In this embodiment, the lower member 122 forms the communicating channel 1221 and has a first guiding surface 1223 and second guiding surface 1224, and the second rotating member 152 is disposed between first guiding surface 1223 and the second guiding surface 1224.

The first guiding surface 1223 and the second guiding surface 1224 are configured to guide the object 50 to move in the communicating channel 1221. In this embodiment, an angle AG between the first guiding surface 1223 and the second guiding surface 1224 is 15 to 75 degrees, but it is not limited thereto. For example, the preferred angle AG may be 65 or 45 degrees. Based on the configuration above, the object 50 can move more smoothly in the communicating channel 1221 and can be thrown out of the opening 1222 farther.

Furthermore, as shown in FIG. 9, the interactive device 100 may further includes a sensor 160 disposed in the communicating channel 1221 and between the first rotating member 142 and the second rotating member 152, and the sensor 160 is configured to sense whether the object 50 enters the communicating channel 1221.

In this embodiment, the driving module DM is configured to drive the first rotating member 142 or the second rotating member 152 to rotate independently. That is, the first rotating member 142 and the second rotating member 152 may not rotate synchronously.

Please return to FIG. 2 and FIG. 4. In some embodiments, the interactive device 100 further includes a circuit module 170 and a video/audio transceiver 172. The circuit module 170 is disposed on the main body 101, and the circuit module 170 may include a control circuit, such as a processing chip. The video/audio transceiver 172 is disposed on the main body 101 and is electrically connected to the circuit module 170, and the video/audio 172 transceiver includes a camera 174.

As shown in FIG. 4, the camera 174 and the opening 1222 face the same side of the main body 101. For example, the camera 174 and the opening 1222 face the left side of the main body 101 in FIG. 4.

In addition, the video/audio transceiver 172 may further include a microphone, a light-emitting diode (not shown). The microphone can receives sound of the pet, and the light-emitting diode may catch the pet's attention. As shown in FIG. 2, the video/audio transceiver 172 may further include a speaker 176, disposed on the rear side of the main body 101.

Moreover, in some embodiments, the circuit module 170 may further include a wireless communication circuit (not shown) configured to receive an external wireless signal. For example, a user may use a smartphone to communicate with the interactive device 100 through the circuit module 170. As a result, the user may see the pet by the camera 174, talk with the pet by the speaker 176 or control the interactive device 100 to provide the object 50 for the pet remotely.

In some embodiments, the control circuit is configured to determine whether the object 50 leaves the opening 1222 according to images or video captured by the camera 174 or a detecting signal from a sensor, such as the sensor 160 or an additional sensor (not shown) near the opening 1222. For example, when the circuit module 170 controls the driving module DM to drive the second rotating member 152 to rotate but no object 50 is thrown out of the opening 1222, the control circuit may determines that the object 50 does not leave the opening 1222 by the captured images or video.

At this time, the control circuit determines that the objects 50 are jammed in the communicating channel 1221, and then the control circuit controls the driving module DM to drive the first rotating member 142 and/or the second rotating member 152 to rotate in a second rotating direction R2, so as to push the objects 50 back. As a result, the problem of the jammed objects 50 can be solved. As shown in FIG. 9, the first rotating direction R1 is the opposite of the second rotating direction R2.

Figure 11:
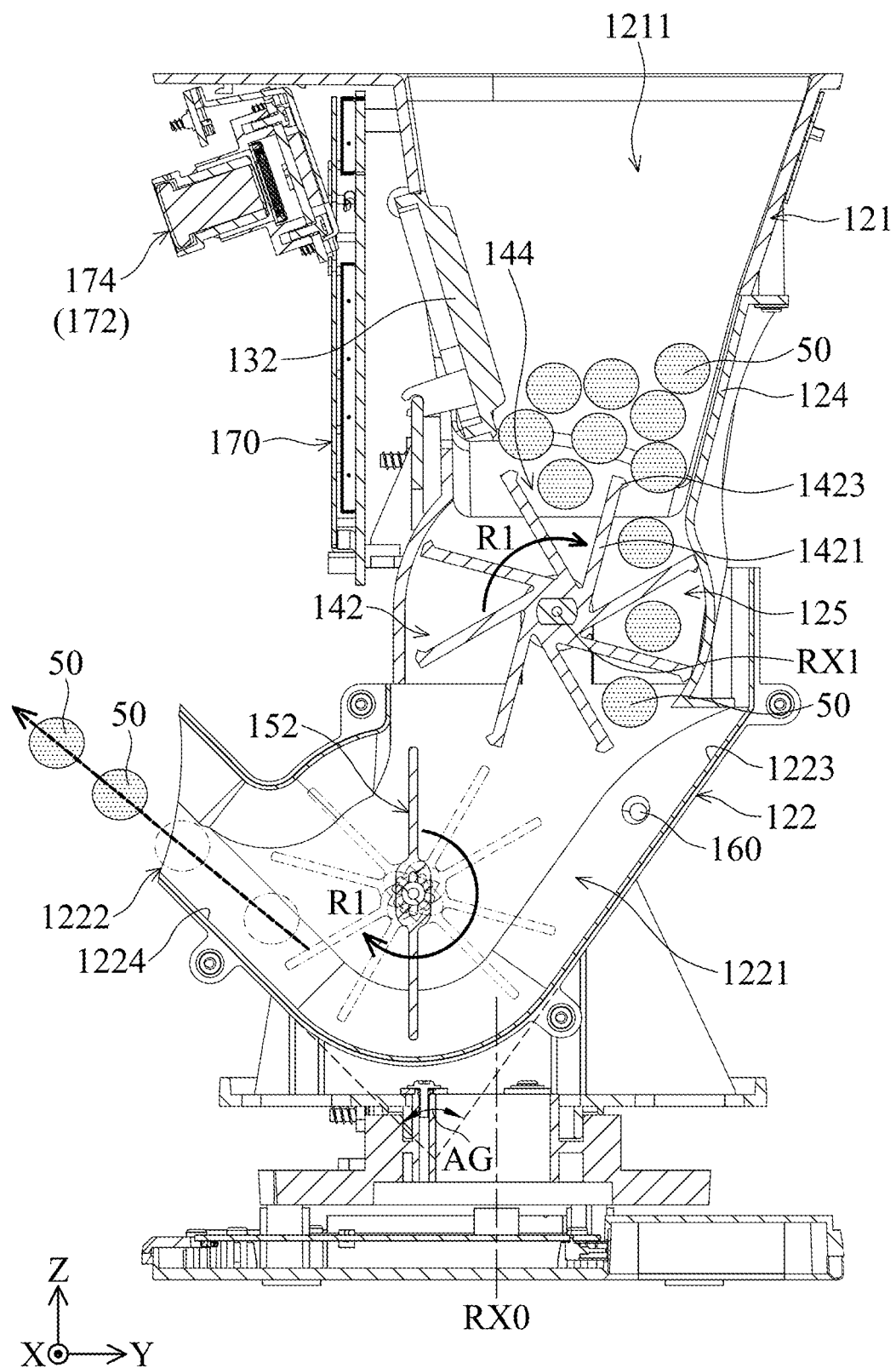
FIG. 11 is a diagram illustrating that more than one objects 50 are driven to leave the opening 1222 according to an embodiment of the present disclosure.

Please refer to FIG. 11, which is a diagram illustrating that more than one objects 50 are driven to leave the opening 1222 according to an embodiment of the present disclosure. In this embodiment, when the user wants to increase the number of the objects to be thrown, the user may user the smartphone to send a control signal to the circuit module 170, and the circuit module 170 may controls the driving module DM to increase the rotating speed of the first rotating member 142.

For example, as shown in FIG. 11, the first rotating member 142 drives two objects 50 into the communicating channel 1221 in one time period, and then the second rotating member 152 drives the two objects 50 to move out of the opening 1222 correspondingly. The number of the objects 50 driven into the communicating channel 1221 is not limited this embodiment, and it depends on the rotating speed of the first rotating member 142. That is, the number of the objects 50 leaving the main body 101 corresponds to the rotating speed of the first rotating member 142.

Figure 12:
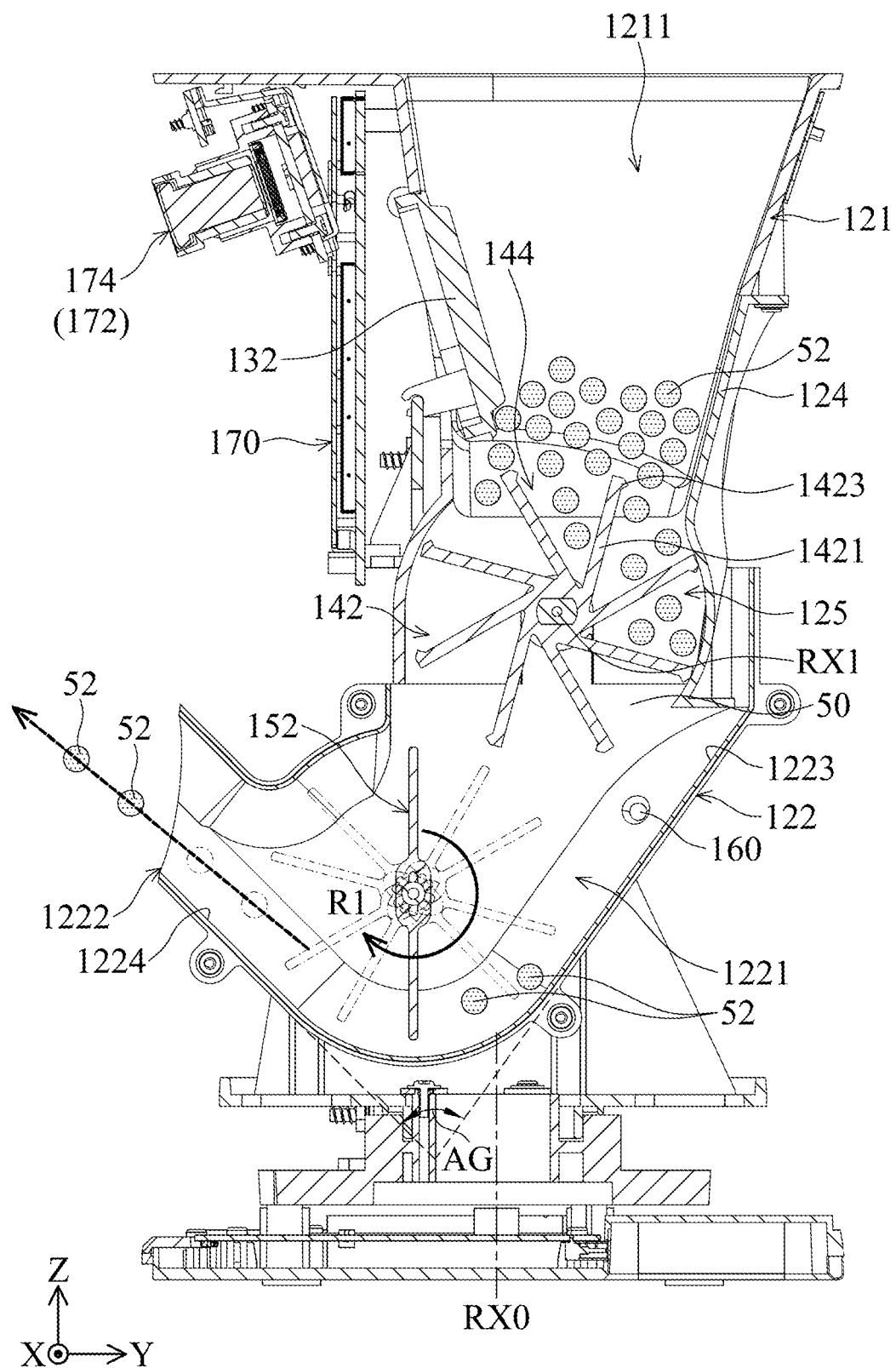
FIG. 12 and FIG. 13 are diagrams illustrating that the accommodating groove 1211 accommodates a plurality of objects 52 according to another embodiment of the present disclosure.
Figure 13:
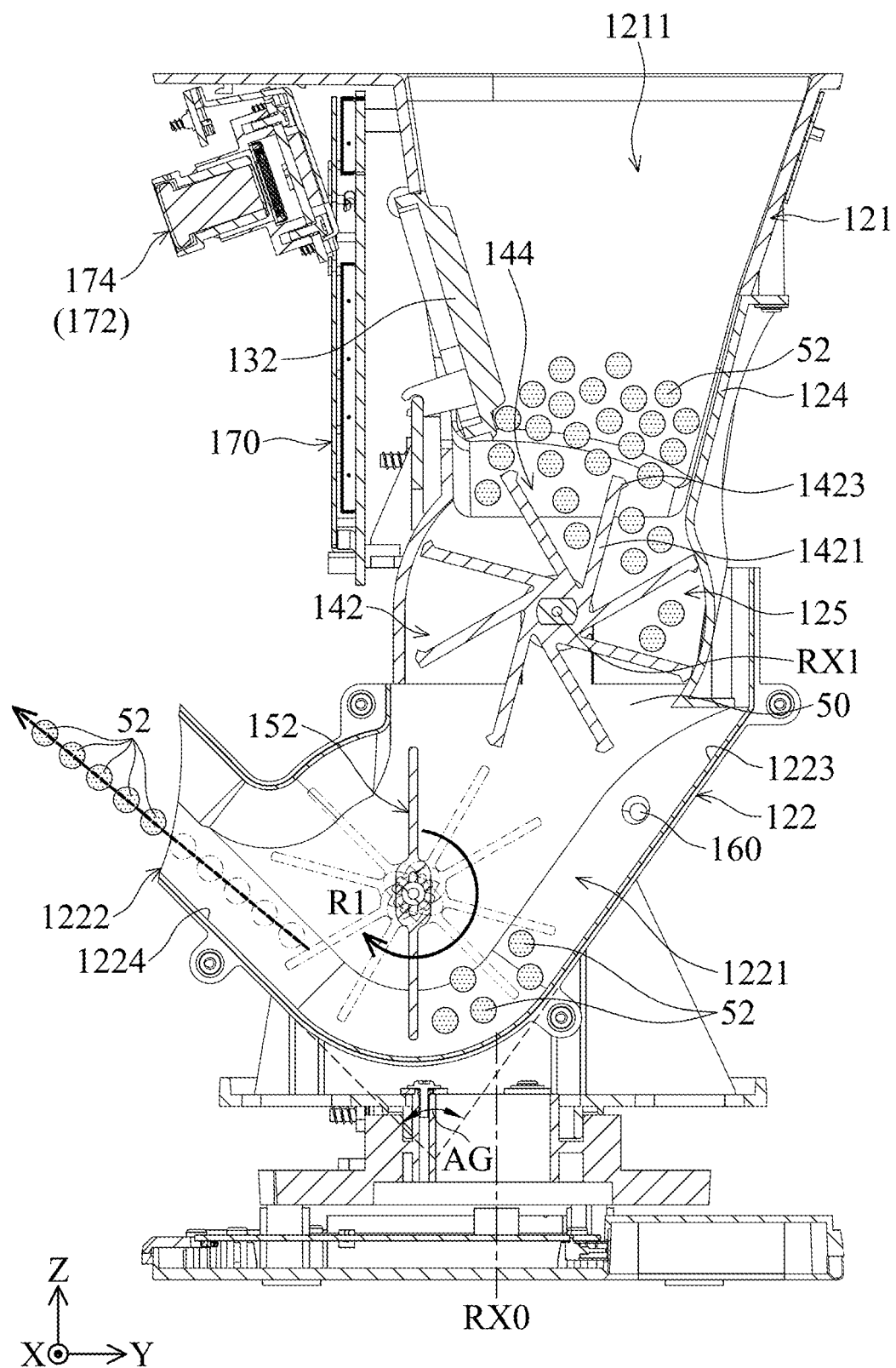

Please refer to FIG. 12 and FIG. 13. FIG. 12 and FIG. 13 are diagrams illustrating that the accommodating groove 1211 accommodates a plurality of objects 52 according to another embodiment of the present disclosure. In this embodiment, the size of the object 52 is smaller than the size of the object 50, so that two or more of the objects 52 can be loaded in each loading slot 144. For example, the diameter of the object may range from 5 mm to 18 mm.

Similarly, the number of the objects 52 to be thrown depends on the rotating speed of the first rotating member 142. For example, as shown in FIG. 12, when the rotating speed of the first rotating member 142 is low, two objects 52 are driven into the communicating channel 1221. In some embodiments, as shown in FIG. 13, when the rotating speed of the first rotating member 142 is high, four or five objects 52 may be driven into the communicating channel 1221 at the same time period.

Figure 14:
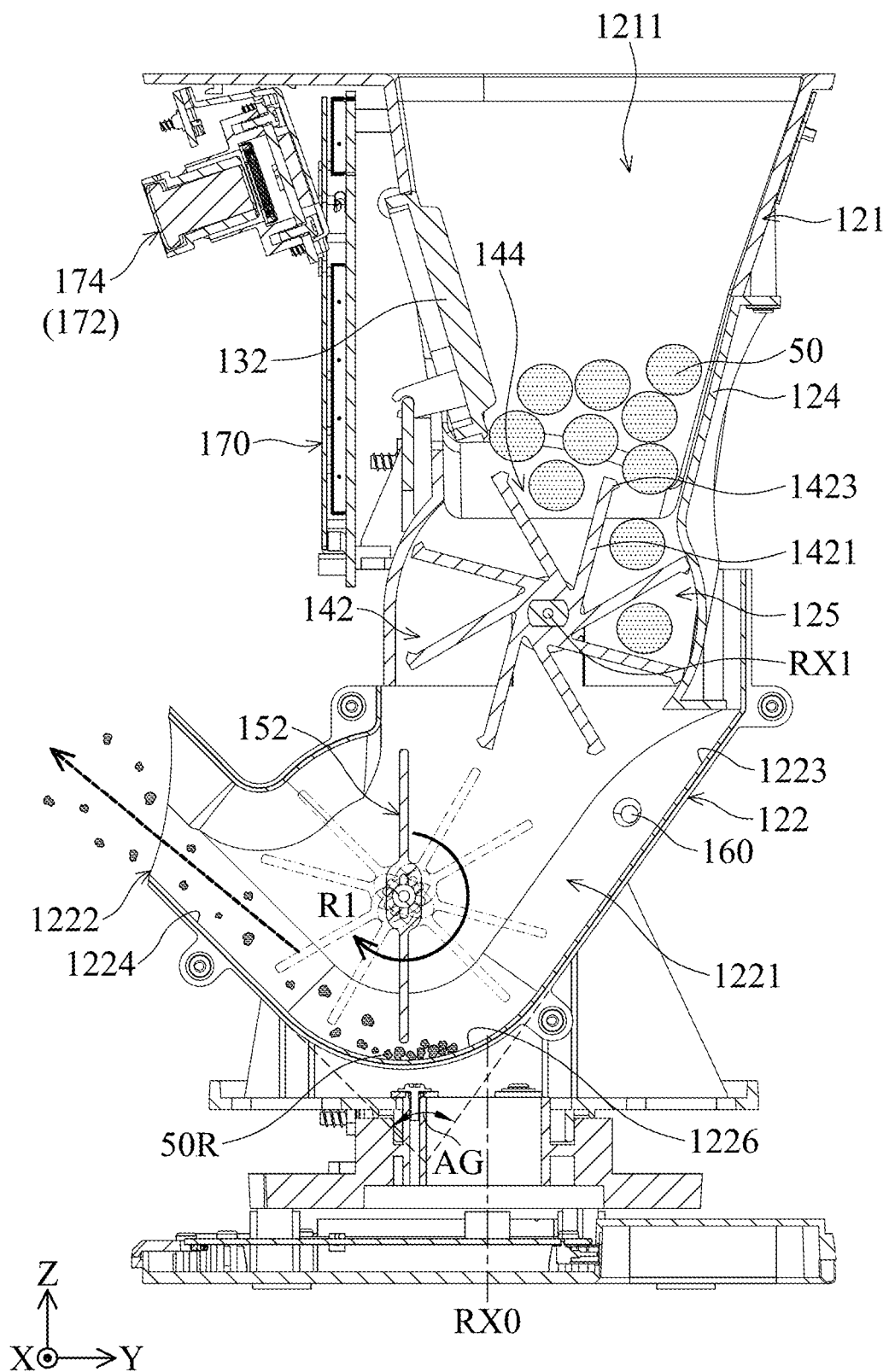
FIG. 14 is a diagram illustrating that the interactive device 100 operates in a clean mode according to an embodiment of the present disclosure.

Please refer to FIG. 14, which is a diagram illustrating that the interactive device 100 operates in a clean mode according to an embodiment of the present disclosure. In this embodiment, the communicating channel 1221 further has an arc surface 1226 connected between the first guiding surface 1223 and the second guiding surface 1224, and some residues 50R of the objects 50 may be accumulated on the arc surface 1226.

In order to ensure that the interactive device 100 throws the objects stably, the user can use the smartphone to control the interactive device 100 to operate in the clean mode. When the interactive device 100 operates in the clean mode, the driving module DM is configured to drive the second rotating member 152 to rotate individually so as to blow the residues 50R out of the communicating channel 1221 through the opening 1222.

In this embodiment, the rotating speed of the second rotating member 152 may be 1500 to 2000 revolutions per minute (rpm), so as to ensure that the residues 50R is cleaned completely. It should be noted that only the second rotating member 152 rotates, and the first rotating member 142 is not rotated when the interactive device 100 operates in the clean mode.

In conclusion, the present disclosure provides an interactive device 100 for the user to interact with his/her pet locally or remotely. The interactive device 100 includes the main body 101, and the main body 101 has the upper member 121 and the lower member 122. The upper member 121 is configured to accommodate a lot of objects 50, and the lower member 122 forms the communicating channel 1221 and the opening 1222 for the objects 50 passing through. The first rotating member 142 and the second rotating member 152 are disposed in the main body 101 for driving the objects 50 to be thrown out of the main body 101 smoothly.

In addition, the user can use a smartphone to control the interactive device 100. For example, the user can control the direction and the number of the objects 50 to be thrown, so as to catch pet's attention effectively. For example, the main body 101 can rotate relative to the base 112 to change the direction. Moreover, the interactive device 100 further includes the video/audio transceiver 172 for allowing the user to interact with the pets remotely.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An interactive device for animals, comprising:
a main body, including an accommodating groove, an opening and a communicating channel;
a driving module, disposed on the main body; and
a first rotating member, rotatably disposed in the main body and separating the communicating channel and the accommodating groove;
wherein when the driving module drives the first rotating member to rotate in a first rotating direction, the first rotating member drives at least one object disposed in the accommodating groove to enter the communicating channel and leave the main body through the opening;
wherein the first rotating member has a rotating axis and a plurality of blades;
wherein a loading slot is formed between adjacent two of the blades, and the loading slot is configured to load the object;
wherein the main body includes an upper member, and the interactive device further includes a pushing mechanism, movably disposed on the upper member, and the driving module includes:
a first motor, disposed on the main body;
a first gear; and
a first rotating shaft, configured to be connected to the first motor, the first rotating member and the first gear;
wherein when the first motor drives the first rotating shaft to rotate, the first gear drives the pushing mechanism to push the object into the loading slot;
wherein the driving module further includes a second gear which is connected to the first rotating shaft, and the pushing mechanism includes:
a pushing member, configured to push the objects; and
a linking member, connected between the pushing member and the first gear and connected between the pushing member and the second gear;
wherein when the first motor drives the first rotating shaft to rotate, the first gear and the second gear cooperatively drive the linking member to move the pushing member forward the accommodating groove.

2. The interactive device for animals as claimed in claim 1, wherein when viewed along the rotating axis, each of the blades deviates from the axis.

3. The interactive device for animals as claimed in claim 1, wherein a protruding portion is formed on an end of each of the blades, and the protruding portion protrudes along the first rotating direction.

4. The interactive device for animals as claimed in claim 1, wherein number of teeth on the first gear and number of blades are the same, and the pushing mechanism further includes an elastic element disposed between the linking member and the upper member.

5. The interactive device for animals as claimed in claim 1, wherein the interactive device further includes a second rotating member, disposed in the communicating channel, and the driving module is configured to drive the second rotating member to rotate in the first rotating direction to push the object to leave the main body.

6. The interactive device for animals as claimed in claim 1, wherein the interactive device further includes a base, the main body is rotatably connected to the base, and the driving module is configured to drive the main body to rotate around a rotating axis of the base.

7. The interactive device for animals as claimed in claim 6, wherein the rotating axis is perpendicular to a rotating axis of the first rotating member.

8. The interactive device for animals as claimed in claim 1, wherein the main body further includes a contacting member, the accommodating groove is formed by the upper member and the contacting member, and an enclosed space is formed by the contacting member and adjacent two of the blades.

9. The interactive device for animals as claimed in claim 5, wherein the interactive device further includes a sensor disposed between the first rotating member and the second rotating member, and the sensor is configured to sense whether the object enters the communicating channel.

10. The interactive device for animals as claimed in claim 5, wherein the main body includes a lower member, the lower member forms the communicating channel and has a first guiding surface and a second guiding surface, the second rotating member is disposed between the first guiding surface and the second guiding surface, and the first guiding surface and the second guiding surface are configured to guide the object to move in the communicating channel.

11. The interactive device for animals as claimed in claim 10, wherein an angle between the first guiding surface and the second guiding surface is 15 to 75 degrees.

12. The interactive device for animals as claimed in claim 10, wherein the communicating channel further has an arc surface connected between the first guiding surface and the second guiding surface, and when there are residues of the object disposed on the arc surface, the driving module is configured to drive the second rotating member to rotate individually so as to blow the residues out of the communicating channel through the opening.

13. The interactive device for animals as claimed in claim 5, wherein the driving module is configured to drive the first rotating member or the second rotating member to rotate independently.

14. The interactive device for animals as claimed in claim 5, wherein after the second rotating member pushes the object to leave the main body, the driving module is configured to drive the second rotating member back to an initial position.

15. The interactive device for animals as claimed in claim 5, wherein a plurality of objects is disposed in the accommodating groove, and a number of the objects leaving the main body corresponds to a rotating speed of the first rotating member.

16. The interactive device for animals as claimed in claim 5, wherein the interactive device further includes:

a circuit module, disposed on the main body, wherein the circuit module includes a control circuit; and a video/audio transceiver, disposed on the main body and electrically connected to the circuit module, wherein the video/audio transceiver includes a camera;

wherein the camera and the opening face the same side of the main body.

17. The interactive device for animals as claimed in claim 16, wherein the control circuit is configured to determine whether the object leaves the opening according to an image captured by the camera or a detecting signal from a sensor disposed in the communicating channel, wherein when the control circuit determines that the object does not leave the opening, the control circuit controls the driving module to drive the first rotating member and/or the second rotating member to rotate in a second rotating direction, and the first rotating direction is opposite of the second rotating direction.

* * * * *